(12) United States Patent
Trampert et al.

(10) Patent No.: US 8,235,295 B2
(45) Date of Patent: Aug. 7, 2012

(54) DATA CARD INSERTION DEVICE

(75) Inventors: Harald Trampert, Villingen-Schwenningen (DE); Torsten Wahler, Bad Duerrheim (DE)

(73) Assignee: Continental Automotive GmbH, Hannover (DE)

( * ) Notice: Subject to any disclaimer, the term of this patent is extended or adjusted under 35 U.S.C. 154(b) by 293 days.

(21) Appl. No.: 12/309,006

(22) PCT Filed: Jul. 2, 2007

(86) PCT No.: PCT/EP2007/056625
§ 371 (c)(1), (2), (4) Date: Dec. 31, 2008

(87) PCT Pub. No.: WO2008/003668
PCT Pub. Date: Jan. 10, 2008

(65) Prior Publication Data
US 2009/0184611 A1    Jul. 23, 2009

(30) Foreign Application Priority Data
Jul. 3, 2006 (DE) .......... 10 2006 030 658

(51) Int. Cl.
*G06K 7/00* (2006.01)
(52) U.S. Cl. ................................. 235/486
(58) Field of Classification Search .......... 235/486
See application file for complete search history.

(56) References Cited

U.S. PATENT DOCUMENTS

| | | | | |
|---|---|---|---|---|
| 4,084,214 | A * | 4/1978 | Eppich ............ | 361/679.08 |
| 5,265,951 | A | 11/1993 | Kumar | |
| 5,300,763 | A * | 4/1994 | Ito et al. .......... | 235/475 |
| 5,532,466 | A * | 7/1996 | Konno et al. ..... | 235/441 |
| 6,105,868 | A * | 8/2000 | Reichardt ........ | 235/441 |
| 6,176,426 | B1 * | 1/2001 | Kanayama et al. ..... | 235/449 |
| 2002/0085339 | A1 | 7/2002 | Hug | |
| 2004/0232233 | A1 * | 11/2004 | Boldt et al. ...... | 235/441 |
| 2006/0214002 | A1 | 9/2006 | Hug | |
| 2009/0184611 | A1 * | 7/2009 | Trampert et al. ..... | 312/223.2 |

FOREIGN PATENT DOCUMENTS

| | | |
|---|---|---|
| DE | 3610202 | 10/1986 |
| DE | 200 21 266 U1 | 3/2001 |
| DE | 19959463 | 6/2001 |
| DE | 10339931 | 3/2005 |
| DE | 10345606 | 4/2005 |
| EP | 0 281 728 | 9/1988 |
| EP | 0379698 | 8/1990 |
| WO | WO 2004/100047 | 11/2004 |

\* cited by examiner

*Primary Examiner* — Michael G Lee
*Assistant Examiner* — David Tardif
(74) *Attorney, Agent, or Firm* — Cozen O'Connor

(57) ABSTRACT

A data card insertion device, in particular for a tachograph of a motor vehicle, with a front panel having a slot-shaped receiving opening through which a data card can be inserted. The device also has a sealing device behind, in the direction of insertion of the data card, which has an insertion slot behind the receiving opening, in the direction of insertion, for the sealed insertion of the data card.

14 Claims, 5 Drawing Sheets

DATA CARD INSERTION DEVICE

PRIORITY CLAIM

This is a U.S. national stage of application No. PCT/EP2007/056625, filed on 2 Jul. 2007, priority is claimed on the following application German Application No.: 10 2006 030 658.9, filed 3 Jul. 2006, the contents of both of which are incorporated here by reference.

BACKGROUND OF THE INVENTION

Field of the Invention

The invention relates to a data card insertion device, in particular for a tachograph of a motor vehicle, with a front panel having a slot-like receiving opening, through which a data card can be inserted, with a sealing device arranged therebehind in the direction of insertion of the data card, which sealing device has an insertion slot arranged behind the receiving opening in the direction of insertion for sealed insertion of the data card, the sealing device comprising a one-piece, sheet-like sealing element of an elastic material, in which the insertion slot is constructed as an incision which is closed by the elasticity of the material of the sealing element, one or two fastening arms which extend in the direction of insertion being arranged at one or both end regions of the sealing element parallel to the insertion slot and/or on the sealing element at one or both end regions of the slot, which fastening arms are fastenable to one or more housing parts of the housing of the data card insertion device.

BACKGROUND OF THE INVENTION

It is known in such a data card insertion device that the sealing device comprises a spring mounted lower elastic element which rests with pretension against an upper sealing element. The data card can be inserted between the elastic element and the sealing element, so displacing the elastic element and forming the insertion slot.

This data card insertion device comprises a plurality of components and occupies a large amount of space.

U.S. Pat. No. 5,265,951 A discloses a data insertion device of the above-stated type.

EP 0 281 728 A furthermore discloses a data card insertion device which has a two-part sealing device, between the two parts of which is formed an insertion slot.

SUMMARY OF THE INVENTION

An object of the invention is therefore to provide a data card insertion device of the above type which consists of few components and occupies only little space.

This object is achieved according to an embodiment of the invention by the sealing device having a one-piece, sheet-like sealing element of an elastic material, in which the insertion slot is constructed as an incision which is closed by the elasticity of the material of the sealing element.

Due to this construction, the sealing device consists of a single component, such that only little installation space is required and simple installation is enabled.

The sheet-like sealing element is furthermore also simple to manufacture.

When there is no data card in the insertion slot, the insertion slot is imperviously closed due to the elasticity of the material of the sealing element without any additional spring elements being required for this purpose.

The two sheet surfaces of the sheet-shaped sealing element which extend transversely in relation to the insertion slot may be constructed parallel to one another.

However, other developments, differing from a plane, of one or both sheet surfaces are possible. One or both of the sheet surfaces may for instance be constructed in a concave or convex or also roof-shaped form.

The transition from the insertion slot of the sealing element to the insertion passage is imperviously enclosed by the passage element, any residual moisture which has passed through the insertion slot with the data card being capable of running out through the drainage openings.

The length of the insertion slot preferably corresponds to the width of the data card or is only slightly larger, such that the data card inserted in the insertion slot is imperviously enclosed due to the elasticity of the sealing element.

The elastic material of the sealing element may here be a plastics material.

The sealing element is simple to manufacture if the sealing element is an injection molding.

To this end, the elastic material of the sealing element may be an elastomer, in particular a thermoplastic elastomer.

Increased conformability to the data card and thus increased sealing reliability is achieved in that the mutually opposing longitudinal sides of the insertion slot are constructed as facing sealing lips.

Resistance to deformation on withdrawal of the data card is achieved in that the sealing element may be supported in the direction opposite to the direction of insertion against a supporting frame entirely or partially surrounding the insertion slot. Simultaneously, the area surrounding the insertion slot is also sealed, such that dirt and moisture cannot get around the outside of the sealing element into the interior of the housing of the data card insertion device.

The fastening arms may extend over the width of the sheet-shaped sealing element.

One or two fastening arms which extend in the direction of insertion may be arranged at one or both end regions of the sealing element parallel to the insertion slot and/or on the sealing element at one or both end regions of the insertion slot, which fastening arms are fastenable to one or more housing parts of the data card insertion device housing, it being possible for the fastening arm(s) to extend over the width of the sheet-shaped sealing element.

To ensure simple production and reduce installation effort, the sheet-shaped sealing element and the fastening arms are preferably of one-piece construction.

The housing parts may entirely or partially form an insertion passage for insertion of the data card.

The transition from the insertion slot of the sealing element to the insertion passage is here imperviously enclosed if the fastening arms form a passage element which encloses the housing parts, is radially circumferentially closed and is open at the opposite end thereof to the sheet-shaped sealing element.

To ensure simple installation and fastening of the passage element to the housing parts, the passage element can be fitted onto the housing parts which are constructed in accordance with its outer contour.

To ensure simple securing of the passage element in its installation position, the housing parts may have on their outer contour one or more projecting lugs which engage in corresponding recesses of the fastening arms or of the passage element.

The passage element achieves substantial dimensional stability in that the wall thickness of the fastening arms or of the passage element amounts to a multiple of the wall thickness of the sheet-shaped sealing element, the wall thickness of the fastening arms or of the passage element preferably amounting to at least twice the wall thickness of the sheet-shaped sealing element.

If one or more drainage through-openings is/are constructed in the lower wall of the passage element, any residual moisture which has passed through the insertion slot with the data card can run out.

BRIEF DESCRIPTION OF THE DRAWINGS

An exemplary embodiment of the invention is shown in the drawings and is described in greater detail below. In the drawings

DETAILED DESCRIPTION OF THE PRESENTLY PREFERRED EMBODIMENTS

Figure 1:
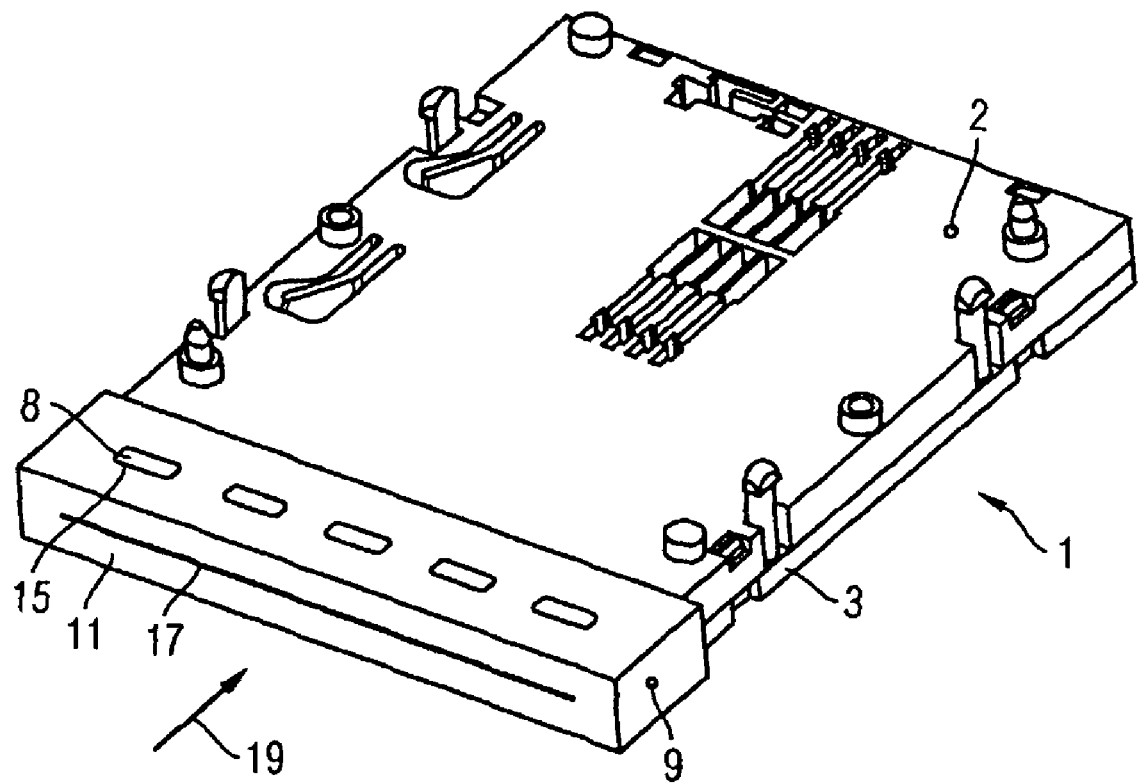
FIG. 1 is a perspective view of a data card insertion device.

The data card insertion device shown for a tachograph of a motor vehicle has a housing 1 which consists of an upper housing part 2 and a lower housing part 3 which are joined together. (FIG. 1)

Figure 2:
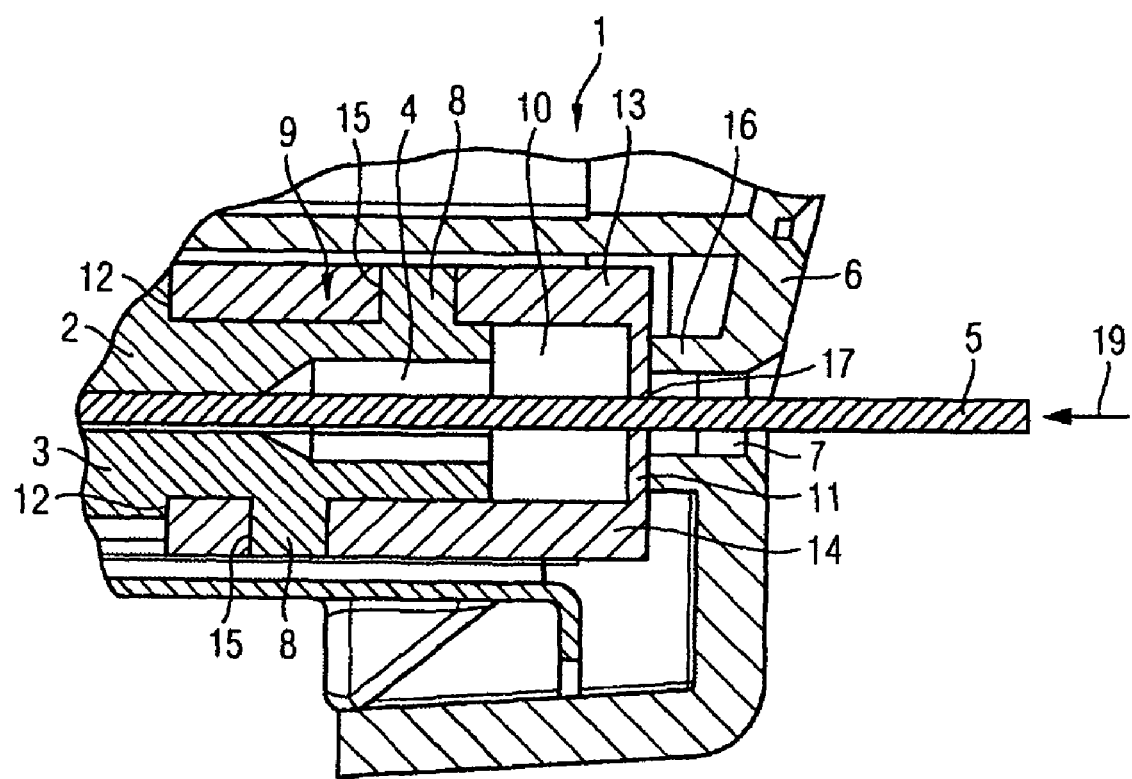
FIG. 2 is a cross-section of a portion of the data card insertion device according to FIG. 1 in the insertion zone with inserted data cart.

An insertion passage 4 for insertion of a data card 5 is constructed between the surfaces of the first housing part 2 and the second housing part 3 which rest against one another. (FIG. 2)

Figure 3:
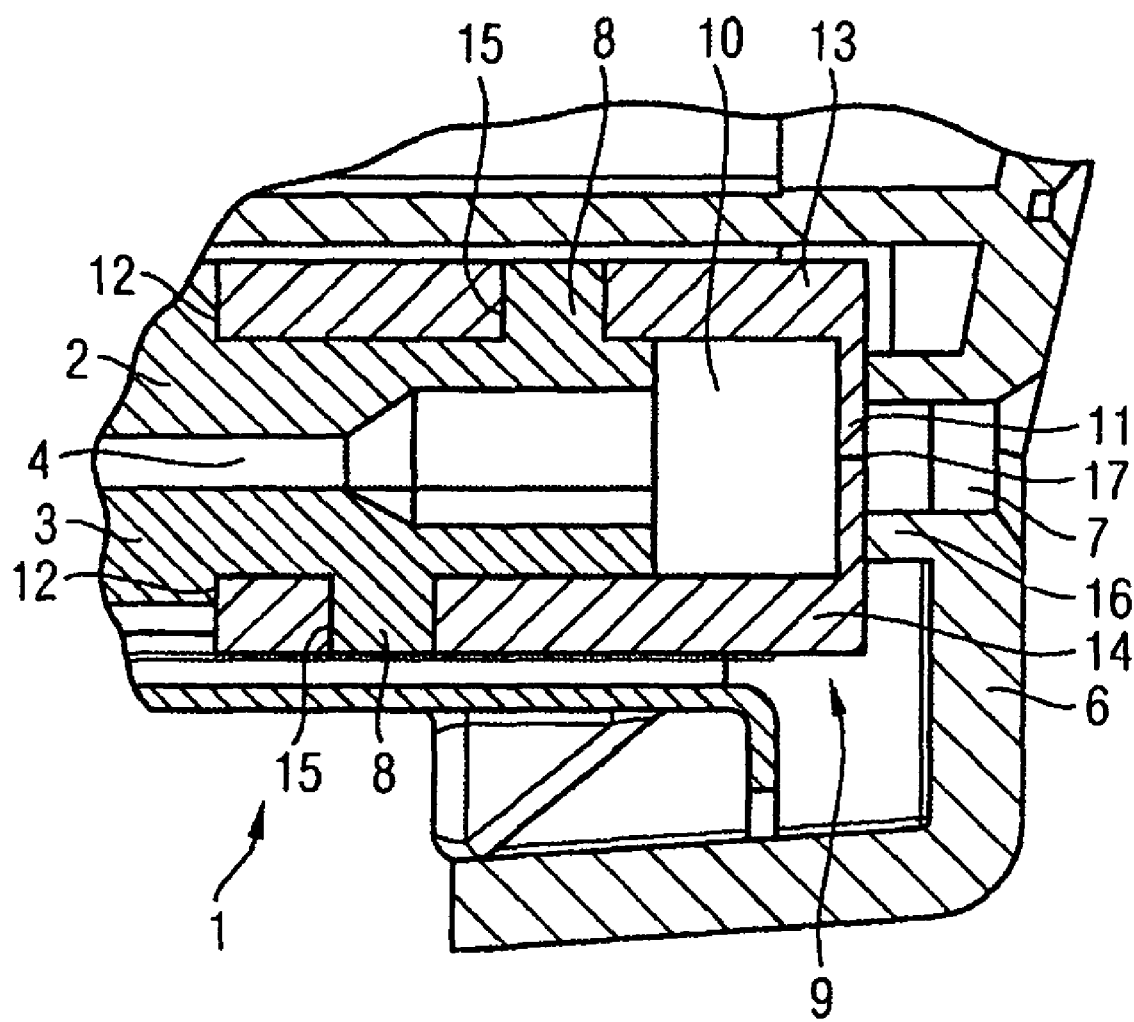
FIG. 3 is the portion according to FIG. 2 without data card.
Figure 4:
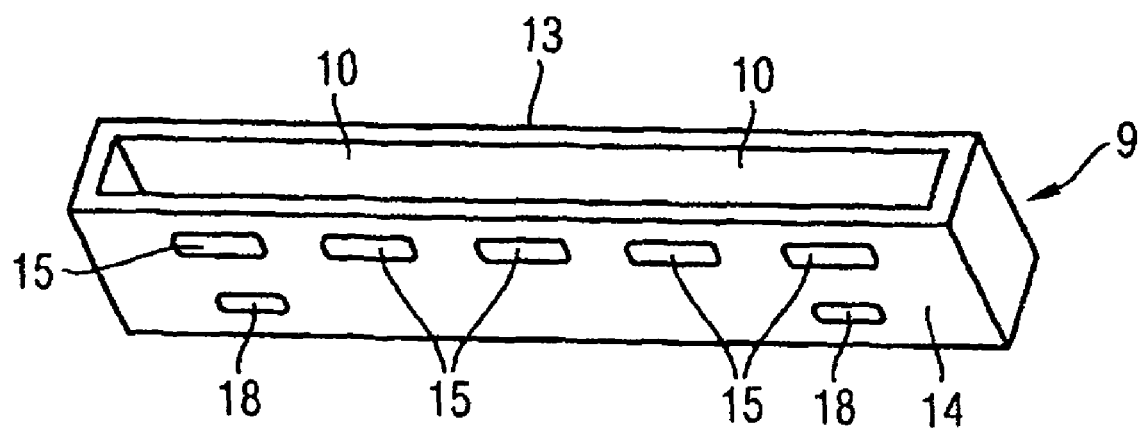
FIG. 4 is a perspective rear view of the sealing element with a passage element of the data card insertion device according to FIG. 1.

On the front, the housing 1 has a front panel 6 at a distance from the upper and lower housing parts 2 and 3, which front panel has a slot-like receiving opening 7 which is opposite, in a plane, to the insertion passage 4. (FIGS. 2, 3)

The end of the upper and lower housing parts 2 and 3 facing the front panel 6 has an outer contour with a transversely lying rectangular cross-section.

A row of five projecting lugs 8 of rectangular cross-section is arranged in each case both on the top of the upper housing part 2 and on the bottom of the lower housing part 3.

Onto the outer contour with a transversely lying rectangular cross-section of the upper and lower housing parts 2 and 3, there is fitted a rectangular tube-like passage element 9 having a corresponding internal cross-section of its internal passage 10, the passage 10 being closed at the front panel end by a sheet-like sealing element 11.

The passage element 9 is pushed onto the upper and lower housing parts 2 and 3 until its opposite end to the sealing element 11 rests against a step which forms a limit stop 12.

Figure 6:
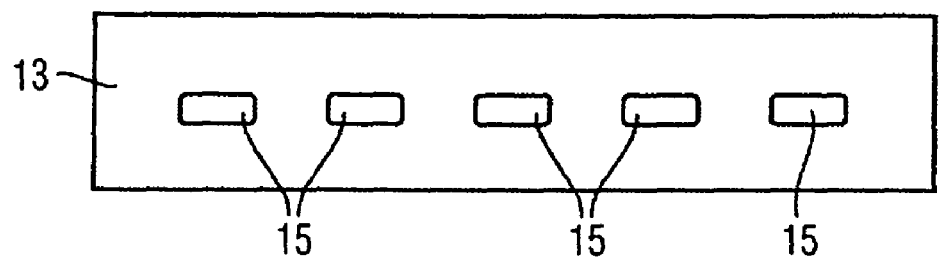
FIG. 6 is a plan view of the sealing element and passage element according to FIG. 4.

The upper wall 13 and the lower wall 14 of the passage element 9 comprises through-recesses 15 constructed correspondingly to the lugs 8, in which the lugs 8 engage once the passage element 9 has been pushed on. (FIG. 6).

The passage element 9 and sealing element 11 are of one-piece construction as an injection molding and consist of a thermoplastic elastomer.

The wall thickness of the upper and lower wall 13 and 14 of the passage element 9 amounts to approximately three times the wall thickness of the sealing element 11, such that the flexibility of the sealing element 11 is greater than the flexibility of the passage element 9.

Thus, while the passage element 9 can indeed be pushed with elastic deformation over the lugs 8 on the outer contour of the upper and lower housing parts 2 and 3 until it rests against the limit stop 12, once the lugs 8 have latched in the recesses 15 it largely retains its injection molded shape.

Once the passage element 9 and sealing element 11 have been installed, the front panel 6 is installed.

The latter comprises a supporting frame 16 directed towards the sealing element 11, the free end face of which supporting frame rests against the sealing element 11.

Manufacturing tolerances of the upper and lower housing parts 2 and 3, of the passage element 9 and sealing element 11 and of the front panel 6 and supporting frame 16 are compensated in that the front frame 16 rests with slight pretension against the sealing element 11.

Figure 7:
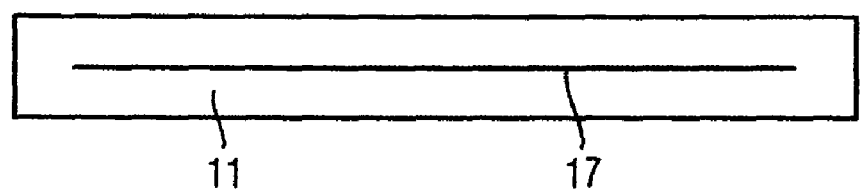
FIG. 7 is an end view of the sealing element and passage element according to FIG.4.
Figure 8:
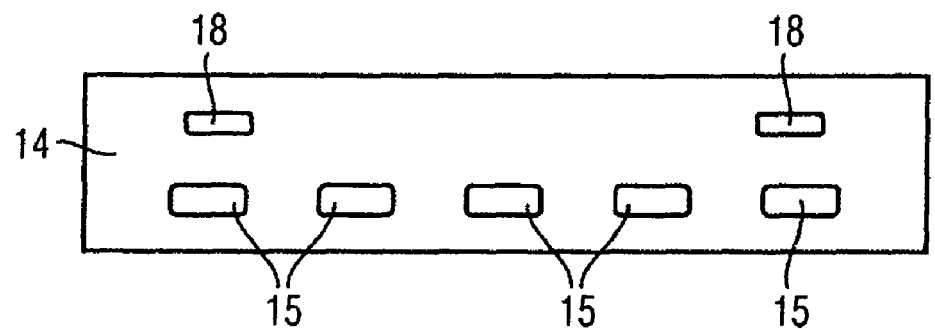
FIG. 8 is a bottom view of the sealing element and passage element according to FIG. 4.

The sealing element 11 has an incision-like opening, through insertion slot 17 (FIG. 7), which extends in the plane of the insertion passage 4 and is closed by the elasticity of the material of the sealing element 11 when no data card 5 is inserted.

The width of the insertion slot 17 approximately corresponds to the width of the data card 5.

As can be seen in FIG. 2, the data card 5 is inserted through the receiving opening 7 of the front panel 6 and the supporting frame 16 into the insertion slot 17 and through the latter into the insertion passage 4.

The insertion slot 17 here widens elastically in accordance with the data card 5, but continues to rest imperviously against the data card 5, surrounding it with elastic pretension.

This makes it possible also to use the data card insertion device in equipment, such as a tachograph, in which the data card 5 is not completely drawn into the piece of equipment, but instead, as can be seen in FIG. 2, in the inserted state still partially sticks out from the data card insertion device.

On insertion of the data card 5 in the direction of insertion 19, the sealing element 11, being applied with elastic pretension against the data card 5, squeegees dirt and moisture from the data card 5 in the manner of a sealing lip.

Figure 5:
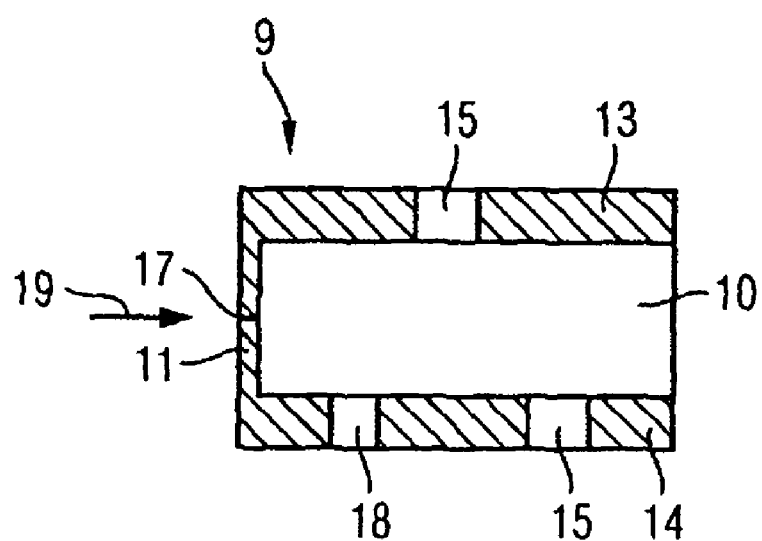
FIG. 5 is a cross-section of the sealing element and passage element according to FIG. 4.

Residual moisture which nevertheless penetrates the insertion slot 17 can collect behind the insertion slot 17 and flow away through two drainage openings 18 in the lower wall 14 of the passage element 9. (FIG. 5)

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A data card insertion device for a tachograph of a motor vehicle comprising:
   a housing having at least one housing part;
   a front panel having a slot-like receiving opening, through which a data card can be inserted; and
   a sealing device arranged behind the front panel in a direction of insertion of the data card, the sealing device having an insertion slot arranged behind the slot-like receiving opening in the direction of insertion, the sealing device comprising:
      a one-piece, sheet-like sealing element of an elastic material having a face in which the insertion slot is configured as a slit that is closed by an elasticity of the elastic material of the sealing element;
      at least one fastening arm extending in the direction of insertion arranged at an end region of the sealing element at least one of parallel to the insertion slot and on the sealing element at an end region of the slot, the at least one fastening arm configured to be fastened to the at least one housing part; and
   a passage element formed by the at least one fastening arm configured to enclose a portion of the at least one housing part, the passage element having one or more drainage through-openings in a wall that is substantially perpendicular to the face of the sealing element,
   wherein the sheet-shaped sealing element and the at least one fastening arm are of one-piece construction.

2. The data card insertion device according to claim 1, wherein the at least one housing part at least partially forms an insertion passage configured for insertion of the data card.

3. The data card insertion device according to claim 2, wherein the at least one or more housing part comprises at least one more projecting lugs on the outer contour of the at least one housing part, the at least one projecting lugs configured to engage in a corresponding recess of at least one of the fastening arm and the insertion passage.

4. The data card insertion device according to claim 2, wherein the wall thickness of the fastening arm or of the insertion passage is at least twice the wall thickness of the sheet-shaped sealing element.

5. The data card insertion device according to claim 1, wherein the length of the insertion slot is configured to substantially match a width of the data card.

6. The data card insertion device according to one claim 1, wherein the elastic material of the sealing element is plastic.

7. The data card insertion device according to claim 1, wherein the sealing element is an injection molding.

8. The data card insertion device according to claims 1, wherein the elastic material of the sealing element is an elastomer.

9. The data card insertion device according to claim 8, wherein the elastic material of the sealing element is a thermoplastic elastomer.

10. The data card insertion device according to claim 1, wherein mutually opposing longitudinal sides of the insertion slot are constructed as face sealing lips.

11. The data card insertion device according to claim 1, wherein the sealing element is supported in a direction opposite the direction of insertion by a supporting frame at least partially surrounding the insertion slot.

12. The data card insertion device according to claim 1, wherein the at least one fastening arm extends over a width of the sheet-shaped sealing element.

13. The data card insertion device according to claim 1, wherein the passage element is configured in accordance with an outer contour of the at least one housing part for fitting onto the at least one housing part.

14. A data card insertion device for a tachograph of a motor vehicle comprising:
   a housing having at least one housing part;
   a front panel having a slot-like receiving opening, through which a data card can be inserted; and
   a sealing device arranged behind the front panel in a direction of insertion of the data card, the sealing device having an insertion slot arranged behind the slot-like receiving opening in the direction of insertion, the sealing device comprising:
      a one-piece, sheet-like sealing element of an elastic material having a face in which the insertion slot is configured as a slit that is closed by an elasticity of the elastic material of the sealing element;
      at least one fastening arm extending in the direction of insertion arranged at an end region of the sealing element at least one of parallel to the insertion slot and on the sealing element at an end region of the slot, the at least one fastening arm configured to be fastened to the at least one housing part; and
   a passage element formed by the at least one fastening arm configured to enclose a portion of the at least one housing part, the passage element having one or more drainage through-openings in a wall that is substantially perpendicular to the face of the sealing element,
   wherein a wall thickness of the fastening arm or of the passage element is thicker than a wall thickness of the sheet-shaped sealing element.

* * * * *